United States Patent
Sukumar et al.

(10) Patent No.: US 9,609,488 B2
(45) Date of Patent: Mar. 28, 2017

(54) MANAGING BROADCAST SERVICES

(71) Applicant: QUALCOMM Incorporated, San Diego, CA (US)

(72) Inventors: Hariharan Sukumar, San Diego, CA (US); Sundar Raman, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/167,977

(22) Filed: Jan. 29, 2014

(65) Prior Publication Data

US 2014/0219157 A1 Aug. 7, 2014

Related U.S. Application Data

(60) Provisional application No. 61/759,544, filed on Feb. 1, 2013.

(51) Int. Cl.
*H04W 4/06* (2009.01)
*H04W 72/00* (2009.01)
*H04W 48/18* (2009.01)

(52) U.S. Cl.
CPC ............ *H04W 4/06* (2013.01); *H04W 48/18* (2013.01); *H04W 72/005* (2013.01)

(58) Field of Classification Search
CPC ...... H04W 72/005; H04W 48/18; H04W 4/06
See application file for complete search history.

(56) References Cited

U.S. PATENT DOCUMENTS

| 8,320,290 | B2 | 11/2012 | Chao et al. | |
| 2009/0185522 | A1 | 7/2009 | Periyalwar et al. | |
| 2010/0284291 | A1* | 11/2010 | Perras | H04H 20/24 370/252 |
| 2010/0312897 | A1 | 12/2010 | Allen et al. | |
| 2011/0110286 | A1 | 5/2011 | Lu et al. | |

(Continued)

FOREIGN PATENT DOCUMENTS

EP 2099161 A1 9/2009

OTHER PUBLICATIONS

3GPP, 3rd Generation Partnership Project; Technical Specification Group Services and System Aspects; Multimedia Broadcast/Multicast Service (MBMS); Architecture and Functional Description (Release 11), 3GPP TS 23.246 v.11.1.0 (Mar. 2012) Technical Specification, Mar. 2012, Sophia Antipolio, France, 66 pgs.

(Continued)

*Primary Examiner* — Chi H Pham
*Assistant Examiner* — Mandish Randhawa
(74) *Attorney, Agent, or Firm* — Holland & Hart LLP

(57) ABSTRACT

Methods, systems, and devices are described for managing broadcasts of data in wireless communications. A request to join a multicast session is received. A plurality of broadcast technology based identifiers associated with the multicast session are received. Each broadcast technology based identifier identifies one of a plurality of radio access technologies (RATs) broadcasting the multicast session. One of the plurality of RATs is selected. A multicast stream of data associated with the multicast session is received from the selected RAT.

22 Claims, 12 Drawing Sheets

(56) References Cited

U.S. PATENT DOCUMENTS

2012/0023178 A1* 1/2012 Drevon et al. ................ 709/206
2012/0224485 A1* 9/2012 Payyappilly ........ H04L 12/4633
　　　　　　　　　　　　　　　　　　　　　　370/235
2012/0263089 A1* 10/2012 Gupta et al. .................. 370/312
2013/0007287 A1* 1/2013 Chu et al. ..................... 709/227
2013/0044668 A1 2/2013 Purnadi et al.
2013/0170357 A1 7/2013 Anchan et al.

OTHER PUBLICATIONS

ISA/EPO, International Search Report and Written Opinion of the International Searching Authority, Int'l App. No. PCT/US2014/013719, Jun. 12, 2014, European Patent Office, Rijswijk, NL, 11 pgs.

* cited by examiner

MANAGING BROADCAST SERVICES

CROSS REFERENCES

The present Application for Patent claims priority to U.S. Provisional Patent Application No. 61/759,544 by Sukumar et al., entitled "Managing Broadcast Services," filed Feb. 1, 2013, assigned to the assignee hereof, and expressly incorporated by reference herein.

BACKGROUND

The following relates generally to wireless communication, and more specifically to managing broadcast and/or multicast services. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. A base station may broadcast within the cell certain multimedia content in data streams that may be accessed on cellular-enabled mobile devices. Within the cell there may be certain mobile devices that are not cellular-enabled, but may still be enabled to communicate wirelessly with a wireless router (e.g., wireless local area network (WLAN) wireless router) or with a data card (e.g., a device capable of sending and/or receiving data over a cellular network) through a universal serial bus (USB) connection.

SUMMARY

The described features generally relate to one or more improved systems, methods, and/or apparatuses for managing requests from devices connected to a data router or a data card to join a multicast group identified by a particular multicast internet protocol (IP) address. The data router and/or data card may enable a connected computing device to send and receive data over a network. The computing device may connect to the data router or data card over a wired or wireless connection. The computing device may be a cellular-enabled device with the cellular capabilities disabled or with limited cellular capabilities, or may be a device without cellular capabilities. In one example, the present systems and methods may map a multicast IP-based identifier to a broadcast technology identifier that may be used to identify multimedia content being broadcasted from a base station using a particular broadcast technology (e.g., CDMA, enhanced multimedia broadcast multicast service (eMBMS), etc.). The system may provide a multicast data stream that includes the multimedia content to the requesting device. In some configurations, the system may replicate the multicast data stream in order to provide the same data stream to several different devices requesting the multimedia content.

A method for managing broadcasts of data in wireless communications is described. A request to join a multicast session is received. A plurality of broadcast technology based identifiers associated with the multicast session may be received. Each broadcast technology based identifier may identify one of a plurality of radio access technologies (RATs) broadcasting the multicast session. One of the plurality of RATs may be selected. A multicast stream of data associated with the multicast session may be received from the selected RAT.

In one embodiment, control information associated with the multicast session may be identified. The control information may be received over one or more of the plurality of RATs. In some cases, an Internet Protocol (IP) pipe may be generated. The IP pipe may be based at least in part on the broadcast technology based identifier identifying the selected RAT. The received multicast stream of data may be transported from a modem processor via the IP pipe. In one embodiment, a number of requests received from distinct entities to join the multicast session may be identified. The multicast session may be identified by a multicast Internet Protocol (IP) address. In one example, a multicast stream of data may be replicated into one or more streams of data based at least in part on the identified number of requests received from distinct entities. The replicated multicast streams of data may be transmitted to the identified number of distinct entities In some embodiments, a first request may be received from a first device to join a first multicast session identified by a first multicast IP address. A second request may be received from a second device to join a second multicast session identified by a second multicast IP address. The second multicast IP address may be different from the first multicast IP address. In some cases, a first broadcast technology based identifier may be determined based at least in part on the first multicast IP address. A second broadcast technology based identifier may be determined based at least in part on the second multicast IP address. In some embodiments, the first broadcast technology based identifier may be used to select a first radio access technology (RAT). The first RAT may implement a first broadcast technology identified by the first broadcast technology based identifier. The second broadcast technology based identifier may be used to select a second RAT. The second RAT may implement a second broadcast technology identified by the second broadcast technology based identifier.

In one configuration, a first multicast stream of data may be received from the first RAT. The first multicast stream of data may be associated with first control information. A second multicast stream of data may be received from the second RAT. The second multicast stream of data may be associated with second control information. In some cases, the first multicast stream of data may be transmitted to the first device. The second multicast stream of data may be transmitted to the second device. In some embodiments, the broadcast technology based identifier may be transferred to a modem processor. The broadcast technology based identifier may identify the selected RAT. Control information used by the selected RAT may be transferred to the modem processor.

In one embodiment, the broadcast technology based identifier may be used to identify an enhanced Multimedia Broadcast Multicast Service (eMBMS) RAT. The eMBMS RAT may send control information that may include a Temporary Mobile Group Identity (TMGI). In some embodiments, the multicast stream of data associated with the multicast session may be received via a Long Term Evolution (LTE) femto cell. In some cases, at least a portion of the multicast stream of data associated with the multicast session may be received using an unlicensed frequency spectrum.

A device configured to manage broadcasts of data in wireless communications is also described. The device may include a processor and a memory in electronic communication with the processor. Instructions may be stored in the memory. The instructions may be executable by the processor to receive a request to join a multicast session, receive a plurality of broadcast technology based identifiers associated with the multicast session, each broadcast technology based identifier identifying one of a plurality of radio access technologies (RATs) broadcasting the multicast session, select one of the plurality of RATs, receive, from the selected RAT, a multicast stream of data associated with the multicast session.

An apparatus to manage broadcasts of data in wireless communications is also described. The apparatus may include means for receiving a request to join a multicast session, means for receiving a plurality of broadcast technology based identifiers associated with the multicast session, each broadcast technology based identifier identifying one of a plurality of radio access technologies (RATs) broadcasting the multicast session, means for selecting one of the plurality of RATs, means for receiving, from the selected RAT, a multicast stream of data associated with the multicast session.

A computer program product for managing broadcasts of data in wireless communications is also described. The computer program product may include a non-transitory computer-readable medium storing instructions executable by a processor to receive a request to join a multicast session, receive a plurality of broadcast technology based identifiers associated with the multicast session, each broadcast technology based identifier identifying one of a plurality of radio access technologies (RATs) broadcasting the multicast session, select one of the plurality of RATs, receive, from the selected RAT, a multicast stream of data associated with the multicast session.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A base station may broadcast within its cell certain channels of multimedia content in multicast internet protocol (IP) data streams. Cellular-enabled mobile devices within the base station's cell may subscribe to one or more of the channels broadcasted by the base station. Additionally, a user of a mobile device that is not cellular-enabled (or a device whose cellular capability has been disabled), may also subscribe to one or more channels broadcasted by the base station through a data router (e.g., wireless local area network (WLAN) router) and/or through a data card (e.g., a data card with a universal serial bus (USB) connection). The router and/or data card may map a multicast IP identifier that identifies a specific multicast session (or channel) to an identifier that is used to identify the broadcast technology used by a base station (e.g., CDMA, enhanced multimedia broadcast multicast service (eMBMS), and the like). The router and/or data card may then receive a multicast data stream according to the broadcast technology identifier. The router and/or data card may relay the received multicast data stream to the requesting device. In some configurations, a router may replicate the multicast data stream in order to provide the same data stream to several different devices requesting the same multicast data stream.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
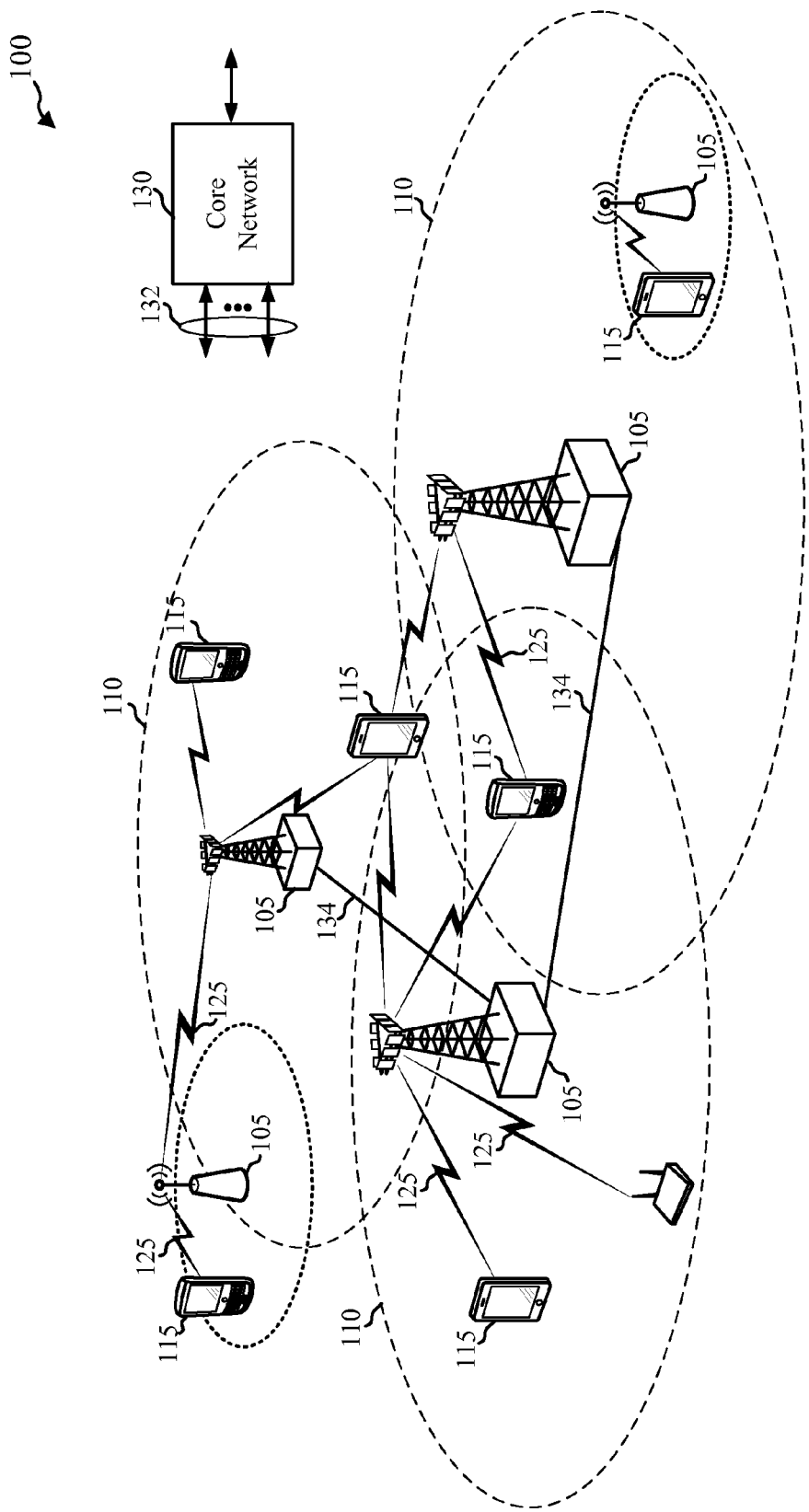
FIG. 1 shows a block diagram of a wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, an evolved NodeB (eNodeB or eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies. In one embodiment, the base stations 105 may broadcast data streams. Each data stream may be associated with at least one multicast session. In one example, each data stream may include control information that informs a receiving device about the content of the associated data stream. The receiving device may analyze the control information to determine whether or not to receive the broadcast of the corresponding multicast data stream.

In some embodiments, the system 100 may be an LTE/LTE-A network. Additionally, or alternatively, the system 100 may include an unlicensed frequency spectrum or a radio access technology that utilizes unlicensed bands. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each base station 105 may provide communication coverage for a macro cell, a pico cell, a femto cell, and/or other types of cell. In one example, an LTE femto cell may be used in system 100. A macro cell generally covers a relatively large geographic area (e.g., several kilometers in radius) and may allow unrestricted access by devices with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one embodiment, a device 115 (such as a laptop, PDA, cellular phone), etc. may send a request to join a particular multicast session that is identified by a multicast IP identifier. The request (and multicast IP identifier) may be sent to a router and/or a data card connected to the device 115. The router and/or data card may map the multicast IP identifier to a broadcast technology identifier. The technology identifier may be used to select the broadcast technology providing the multicast data stream for the desired multicast session. The control information for the multicast data stream may be received from the base station implementing the selected broadcast technology. Upon identifying the control information, the router and/or data card may receive the multicast data stream corresponding to the identified control information. The router and/or data card may provide the device 115 with access to the multicast data stream. For example, the router may relay the multicast data stream to the device 115.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The mobile device 115 may send a connection request to communicate with a particular base station 105. The base station 105 may reject the request if the cell is congested. Upon receiving the rejection, the mobile station 115 may control when to retransmit a connection request in order to avoid adding additional congestion. While the wireless network 100 is described in relation to LTE/LTE-Advanced architectures, those skilled in the art will readily appreciate, the various concepts presented throughout this disclosure may be extended to other types of wireless networks.

Figure 2:
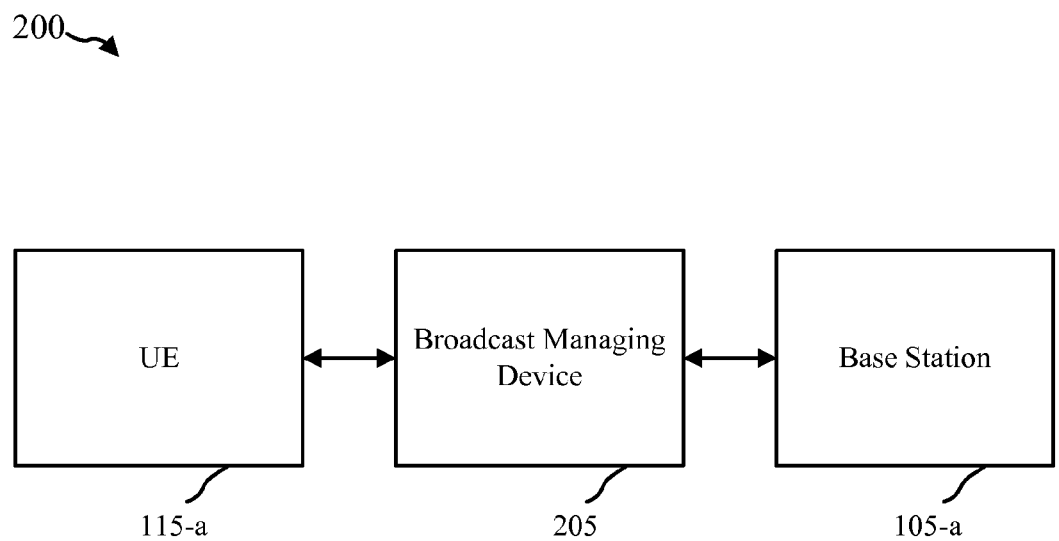
FIG. 2 shows a block diagram of an example of a broadcast managing device for implementing functionality in the wireless communications system.

FIG. 2 shows a block diagram 200 of an example of a broadcast managing device 205 for implementing functionality in the wireless communications system 100 of FIG. 1. The base station 105-*a* and UE 115-*a* may be examples, respectively, of the base stations 105 and UEs 115 of FIG. 1. Each of the depicted components may be in communication with each other.

In one embodiment, the broadcast managing device 205 may receive a request from the UE 115-*a* to join a multicast session broadcasted by the base station 105-*a* using a broadcast technology. The multicast session may be identified by a multicast IP address. In some embodiments, the UE 115-*a* may be a computing device that lacks cellular capabilities, or a computing device with cellular capabilities, but connected to the broadcast managing device 205 through a data router or a data card. In some configurations, the broadcast managing device 205 may be located in a data router. Additionally, or alternatively, the broadcast managing device 205 may be located in a data card (e.g., a data card with a USB connection). In one example, the broadcast managing device 205 may be located in a WLAN router. Additionally, or alternatively, the broadcast managing device 205 may be located in a mobile device (e.g., UE 115-*a*) with WLAN routing capabilities.

In certain embodiments, the broadcast managing device 205 may receive a first request from a first device (e.g., UE 115-*a*) to join a first multicast session identified by a first multicast IP address, and may receive a second request from a second device (e.g., a UE device different from UE 115-*a*) to join a second multicast session identified by a second multicast IP address. In some configurations, the second multicast IP address may be different from the first multicast IP address. Alternatively, the first and second multicast IP addresses may be the same IP address.

In some embodiments, the broadcast managing device 205 may identify an association between a multicast IP address and a broadcast technology based identifier. The broadcast technology base identifier may identify a particular broadcast technology. The device 205 may then identify and receive the multicast session from a base station that is broadcasting the multicast session according to the broadcast technology identified by the broadcast technology based identifier. The broadcast managing device 205 may relay the requested multicast data stream to the device.

Figure 3:
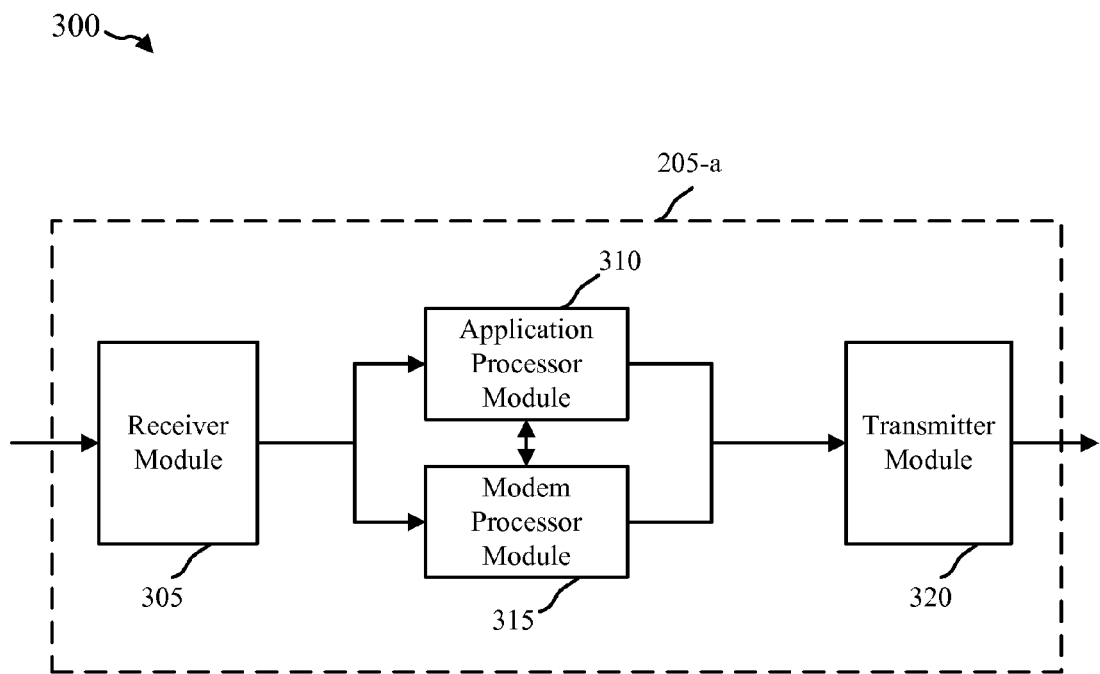
FIG. 3 shows a block diagram of an example of an application processor module and a modem processor module for implementing functionality of the broadcast managing device.

FIG. 3 shows a block diagram 300 of an example of a broadcast managing device 205-*a*. The device 205-*a* may be an example of the broadcast managing device 205 described in FIG. 2. In one example, the device 205-*a* may include an application processor module 310 and a modem processor module 315. The modules 310 and 315 may be in communication with a receiver module 305 and a transmitter module 320. Each of the components may be in communication with each other.

The components of the broadcast managing device 205-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 305 may receive requests from a device, such as a UE 115, to join a multicast session. The receiver module 305 may also receive multicast data streams from a base station 105. In one example, the device 115 may transmit a request to the broadcast managing device 205-*a* to receive multimedia content being multicast from a certain IP address. The application and modem processor modules 310 and 315 may control the transmission of the requests from the device 115 to retrieve broadcasts from the base station 105 in a wireless communications network.

In one embodiment, the application processor module 310 may query the modem processor module 315 as to which broadcast technologies are available. In one example, the modem processor module 315 may reply to the query to inform the application processor module 310 the broadcast technologies that are currently available to be received at the modem processor module 315. In some cases, the modem 315 may inform the application processor module 310 which broadcast technologies are available without receiving a query from the application processor module 310. As an example, broadcasts over a 1x network and an LTE network may both be available at the modem processor module 315. The modem 315 may inform the application processor module 310 that these two different radio access technologies (RATs) are currently available to provide multicast streams of data. In one configuration, the modem processor module 315 may pass a list of broadcast technology based identifiers to the application processor module 310. Each identifier on the list may identify a particular RAT that is currently broadcasting to the modem 315. The application processor module 310 may further query the modem 315 as to the different channels (i.e., control information) that are transmitted by each RAT. While broadcast technologies associated with a 1x network and an LTE network are described, it is to be understood that the present systems and methods may be implemented with other broadcast technologies such as, but not limited to, MediaFLO, WiMAX, etc.

In one configuration, when the application processor 310 receives a request to join a multicast session, the application processor 310 may receive out-of-band signaling that identifies the control information for the requested multicast session. The application processor 310 may translate (or map) the multicast IP address to a broadcast technology based identifier. The broadcast technology based identifier may identify a particular broadcast technology. For example, the application processor 310 may be aware that the modem processor module 315 is capable of receiving broadcasts from a CDMA-based RAT and an eMBMS-based RAT. The application processor module 310 may also be aware of the different channels (i.e., control information) that are currently being transmitted from each RAT. In one configuration, the application processor module 310 may select one of the available RATs. Using the out-of-band signaling, the application processor module 310 may identify the control information transmitted by the selected RAT that corresponds to the desired multicast session. The application processor module 310 may map the multicast IP address to the broadcast technology based identifier of the selected RAT. The application processor module 310 may transfer the broadcast technology based identifier and the control information for the desired multicast session to the modem processor module 315. Using the technology identifier and control information, the modem processor module 315 may receive the corresponding multicast stream of data from the base station transmitting according to the selected RAT. The modem processor module 315 may receive the multicast stream of data from the base station 105 through the receiver module 305.

The broadcast managing device 205-a may transmit the multicast stream of data to the device 115 through the transmitter module 320. In one example, the transmitter module 320 may include a cellular transmitter. The broadcast managing device 205-a may transmit or forward a connection request via the transmitter module 320 to a base station 105. Further details regarding the application and modem processor modules 310 and 315 will be described below.

Figure 4:
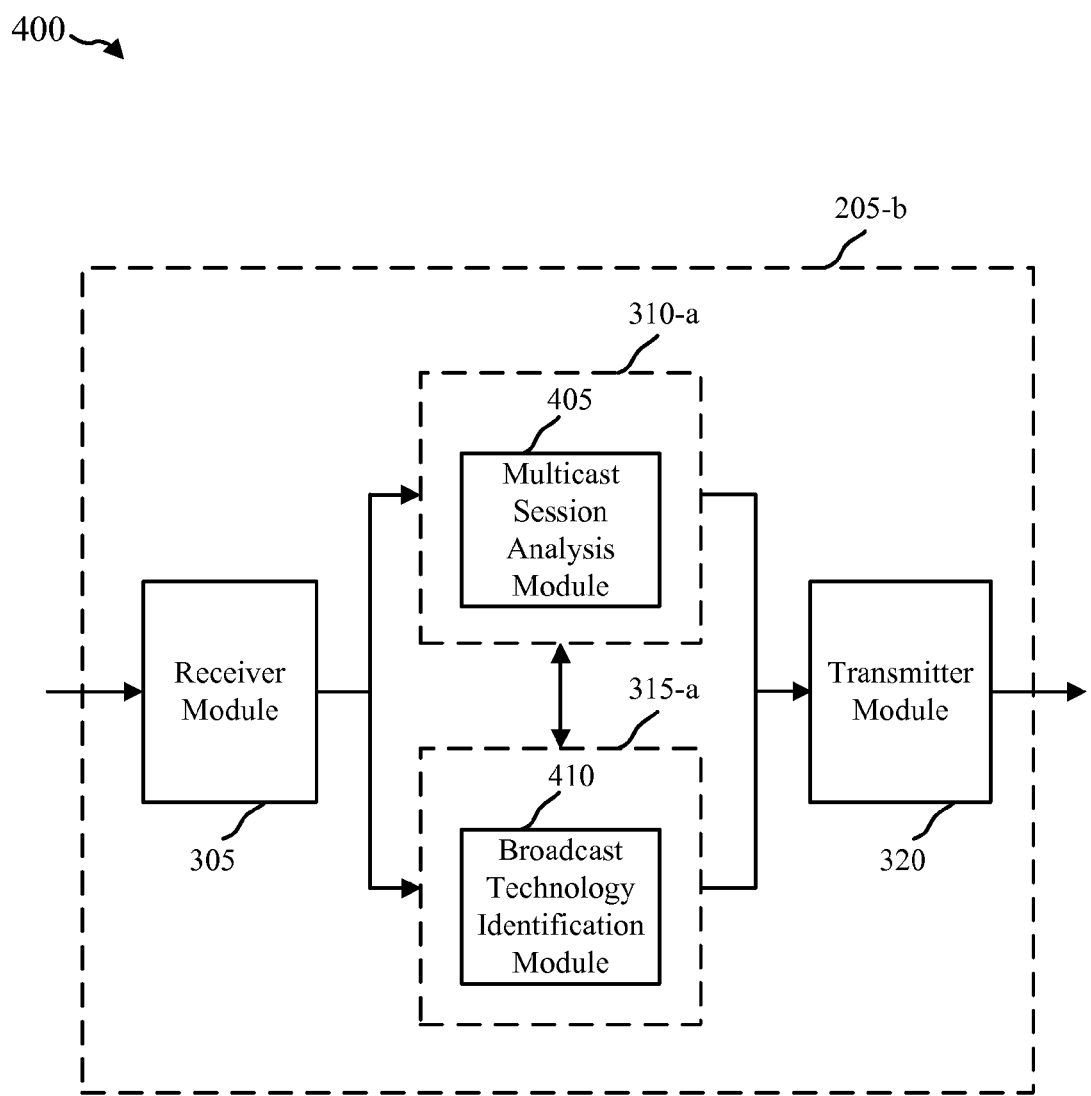
FIG. 4 shows a block diagram of an example of a multicast session analytical module and a broadcast technology identification module for implementing functionality of the broadcast managing device.

FIG. 4 shows a block diagram 400 of a broadcast managing device 205-b. The broadcast managing device 205-b may be an example of the broadcast managing device 205 described in FIGS. 2 and/or 3. In one example, the device 205-b may include an application processor module 310-a and a modem processor module 315-a. The application processor module 310-a and the modem processor module 315-a may be examples of the modules 310, 315 described in FIG. 2. In one example, the application processor module 310-a may include a multicast session analysis module 405. The modem processor module 315-a may include a broadcast technology identification module 410. Each of the depicted components may be in communication with each other.

The components of the broadcast managing device 205-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 305 may receive a request from a UE 115. The request may include a request to join a multicast session. The multicast session may be identified by a multicast IP address. In some embodiments, the multicast session analysis module 405 may analyze the request from the UE 115 to join the multicast session. The multicast session analysis module 405 may identify the multicast IP address of the multicast session. In one embodiment, the multicast session analysis module 405 may identify an association between the identified multicast IP address and a broadcast technology identifier. In some cases, the multicast session analysis module 405 may translate an identified multicast IP address into a broadcast technology identifier. The module 405 may also identify the control information for the requested multicast session. The application processor module 310-a may communicate the broadcast technology identifier and control information to the modem processor module 315-a.

In one configuration, the broadcast technology identification module 410 may receive the identifier that is associated with the multicast IP address. The broadcast technology identification module 410 may receive, via the receiver module 305, control information for at least one multicast data stream transmitted from the base station 105 using the broadcast technology identified by the broadcast technology based identifier. In one configuration, the module 410 may receive a plurality of broadcast technology based identifiers, each identifying a different radio access technology (RAT) that is transmitting the desired multicast session. The modem 315-a may arbitrate between the plurality of RATs and select the RAT based on one or more conditions (e.g., max rate, channel conditions. etc.) The control information may identify a multicast data stream and the broadcast technology based identifier may identify the broadcast technology being implemented by the base station 105.

Upon identifying the desired multicast data stream (from the control information) being transmitted according to the technology identified by the identifier, the broadcast technology identification module 410 may generate a dedicated IP connection between the modem processor module 315-a and the application processor module 310-a, over which the requested multicast session may be streamed. The modem processor module 315-a may receive the multicast data stream, transfer the stream to the application processor module 310-a via the dedicated IP connection, and the application processor module 310-a may transmit the stream via the transmitter module 320 to at least the UE 115 that requested to join the multicast session.

Figure 5:
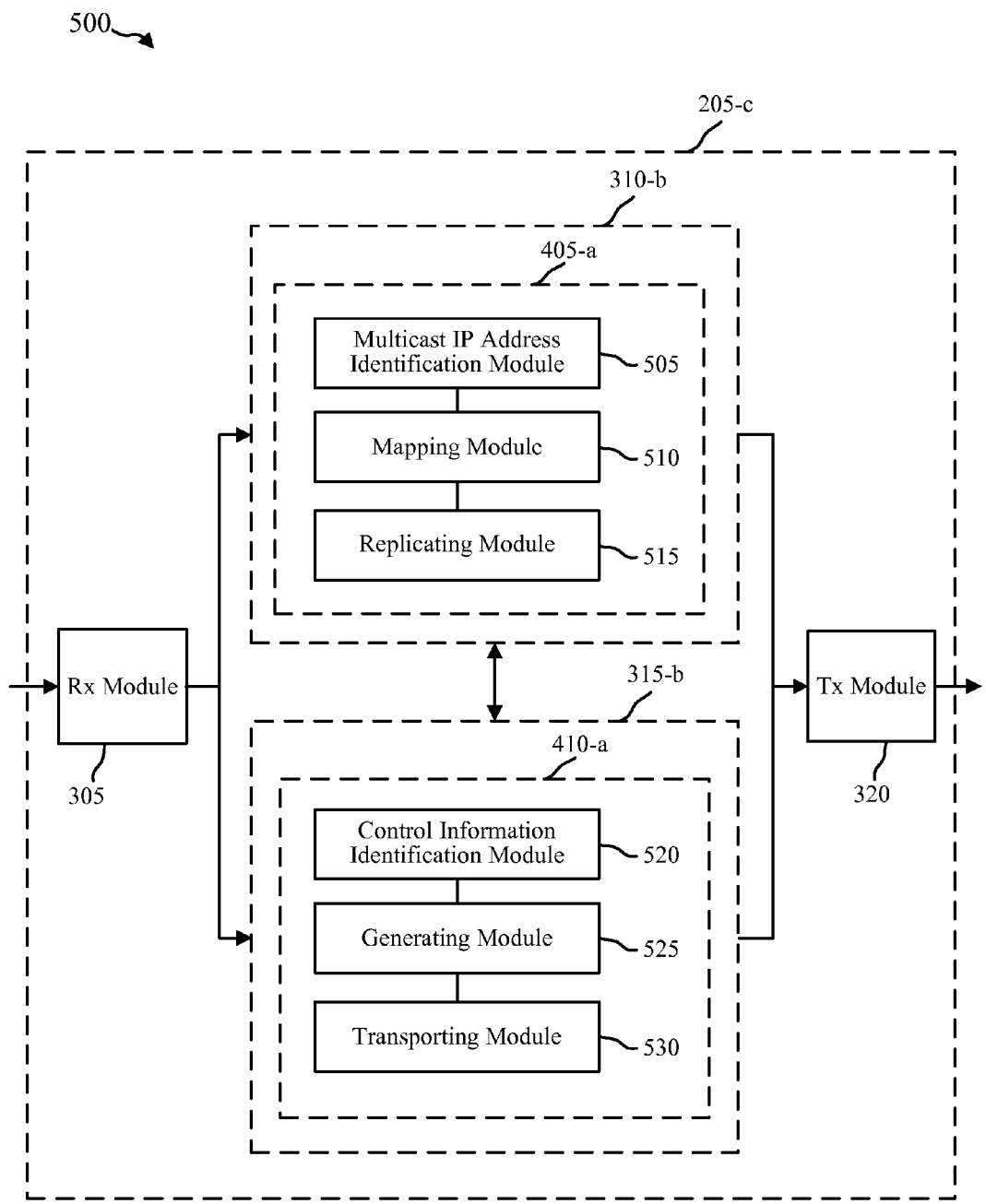
FIG. 5 shows a block diagram illustrating one embodiment of various modules to manage multicast content broadcasted in a wireless communications system.

FIG. 5 shows a block diagram 500 illustrating one embodiment of a broadcast managing device 205-c in accordance with the present systems and methods. The broadcast managing device 205-c may be an example of the broadcast managing device 205 described in FIGS. 2, 3, and/or 4. The device 205-c may include an application processor module 310-b and a modem processor module 315-b, as previously described. The application processor module 310-b may include a multicast session analysis module 405-a and the modem processor module 315-b may include a broadcast technology identification module 410-a, as previously described. In one configuration, the multicast session analysis module 405-a may include a multicast IP address identification module 505, a mapping module 510, and a replicating module 515. In one embodiment, the broadcast technology identification module 410-a may include a control information identification module 520, a generating module 525, and a transporting module 530. Each of the components may be in communication with each other.

The components of the broadcast managing device 205-c may, individually or collectively, be implemented with one or more application-specific integrated circuits (ASICs) adapted to perform some or all of the applicable functions in hardware. Additionally, or alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, one or more base stations may transmit one or more channels that carry multimedia content (e.g., video, music, etc.). The one or more base stations may transmit the channels using different or the same transmission technologies (e.g., eMBMS, CDMA, etc.) Each channel may be identified by a particular multicast IP address. Some devices (e.g., laptop, PDA, etc.) may not be enabled to receive a multicast stream of data of a channel directly from a base station. For instance, a user may disable direct communication with the base station 105, or the device may not include the capability to receive transmissions according to a particular broadcast technology.

The broadcast managing device 205-c may transmit a multicast data stream of a channel to the device via the transmitter module 320. In one configuration, the multicast session analysis module 405-a may receive from the device a request to join a multicast session identified by a multicast IP address. The multicast IP address identification module 505 may analyze the request to identify the multicast IP address. The mapping module 510 may identify an association between the identified multicast IP address and a broadcast technology based identifier. In some cases, mapping module 510 may translate or map the identified multicast IP address to a broadcast technology based identifier. The broadcast technology based identifier may identify the particular type of broadcast technology used by one or more base stations to broadcast a multicast stream of data. In some embodiments, the multicast stream of data associated with the multicast session may be received via a Long Term Evolution (LTE) femto cell or a home eNode B (HeNB). In one example, at least a portion of the multicast stream of data associated with the multicast session may be received using a licensed or an unlicensed frequency spectrum. In some cases, an unlicensed band may be used as a supplemental downlink (SDL) in association with a primary cell operating on a carrier in a licensed band. In some cases, an unlicensed band may be used in a shared-use configuration with a different wireless technology such as an 802.11 wireless technology.

The application processor module 310-b may identify the control information for the identified broadcast technology. The control information may be associated with the requested multicast session. The application processor module 310-b may transfer the broadcast technology based identifier and identified control information to the modem processor module 315-b. The control information identification module 520 may use the control information received from the application processor 310-b to identify control information received from one or more RATs (e.g., global system for mobile communications (GSM), universal mobile telecommunications system (UMTS), long term evolution (LTE), etc.). In some embodiments, the modem processor module 315-b may receive the control information for the requested multicast stream of data broadcasted from one of the plurality of RATs.

In some configurations, the control information may include a temporary mobile group identity (TMGI) that is used to identify a certain channel (i.e., a multicast data stream) being broadcasted according to eMBMS broadcasting technologies. The control information identification module 520 may determine that the control information is associated with the desired multicast data stream. The modem processor module 315-b may then receive the desired multicast data stream associated with the control information. The desired multicast data stream may be broadcasted from a particular RAT according to the broadcast technology identifier. In some configurations, the generating module 525 may generate one or more dedicated IP channels (i.e., IP pipes) between the modem processor module 315-a and the application processor module 310-b. The transporting module 530 may transport the received multicast stream of data to the application processor module 310-b using the dedicated IP channel. The application processor module 310-a may transmit the multicast stream of data to the device that requested to join the multicast session.

In some embodiments, multiple devices may request to join the same multicast session. The multicast session analysis module 405-a may include a replicating module 515. Upon receiving the desired multicast data stream from the modem processor module 315-b, the replicating module 515 may replicate the stream. As a result, multiple copies of the data stream may be transmitted to each of the multiple devices.

In one example, the multicast session analysis module 405-a may identify a number of requests received from distinct entities (e.g., two or more devices) to join the multicast session identified by a multicast IP address. In one embodiment, the mapping module 510 may identify an association between the identified multicast IP address and a broadcast technology based identifier. In some cases, mapping module 510 may translate or map the identified multicast IP address to a broadcast technology based identifier. The application processor module 310-b may transfer the broadcast technology based identifier (and control information for the data stream for the multicast session) to the modem processor module 315-b. The control information identification module 520 may use the control information to identify control information received from one of a plurality of RATs according to the broadcast technology indicated by the identifier. The multicast data stream corresponding to the identified control information may be transported to the application processor module 310-b via a dedicated IP pipe. The replicating module 515 may replicate the multicast stream of data into one or more streams of data based at least in part on the identified number of requests received from distinct entities. The broadcast managing device 205-c may transmit the replicated multicast streams of data to the identified distinct entities that requested to join the same multicast session.

In some embodiments, two or more devices may request to join different multicast sessions. In one example, the broadcast managing device 205-c may receive multiple requests and enable each device to receive content transmitted from the multicast session associated with each particular request. The multicast session analysis module 405-a may receive a first request from a first device to join a first multicast session identified by a first multicast IP address. The module 405-a may also receive a second request from a second device to join a second multicast session identified by a second multicast IP address. In one configuration, the second multicast IP address may be different from the first multicast IP address. The mapping module 510 may identify an association between the first multicast IP address and a first broadcast technology based identifier, and may identify an association between the second multicast IP address and a second broadcast technology based identifier. The application processor module 310-b may transfer the first and second broadcast technology based identifiers and the control information identifying the data streams for each multicast session to the modem processor module 315-b. The control information identification module 520 may use the control information to identify first control information received from one of a plurality of RATs according to a certain broadcast technology. The module 520 may use the control information to identify second control information received from the same RAT. The modem processor module 315-b may receive a first multicast stream of data from the RAT. The first multicast stream of data may be associated with the first control information. The modem processor module 315-b may also receive a second multicast stream of data from the RAT. In one embodiment, the second multicast stream of data may be associated with the second control information. The transporting module 530 may transport the first multicast stream of data to the application processor module 310-*b* via a first IP pipe generated by the generating module 525. The transporting module 530 may also transport the second multicast stream of data to the application processor module 310-*b* via a second IP pipe generated by the generating module 525. The first and second multicast streams of data may then be transmitted to the first and second devices, respectively.

Figure 6:
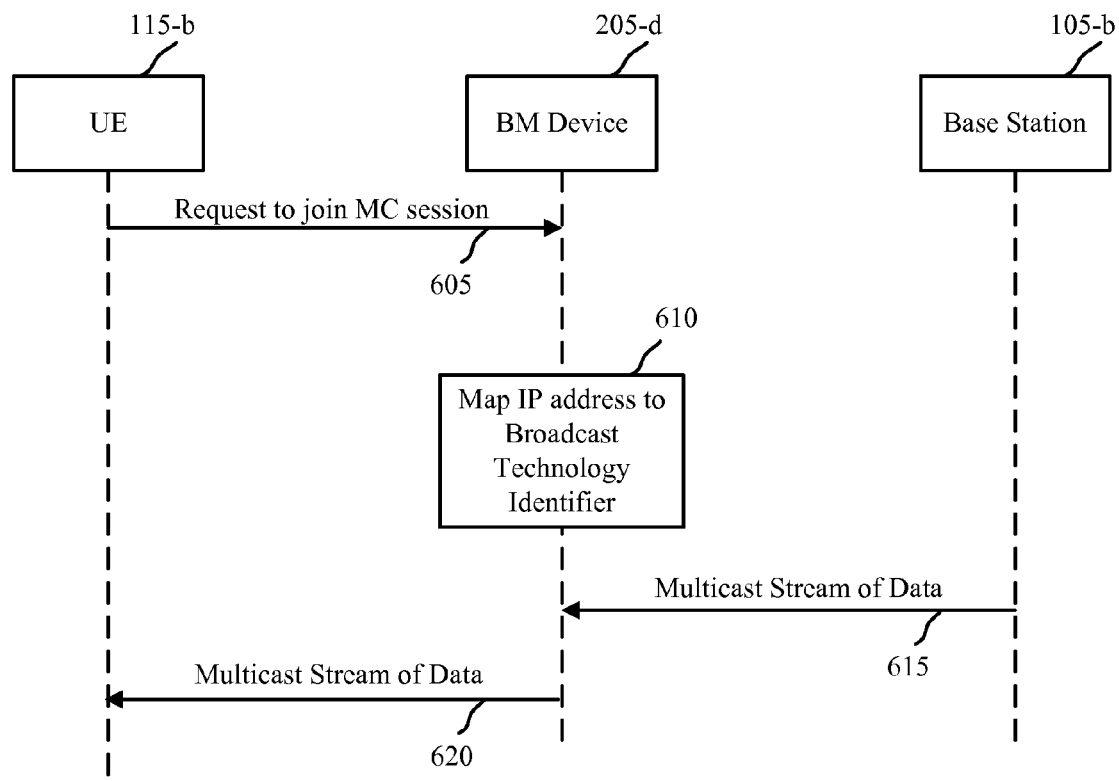
FIG. 6 is a message flow diagram of a connection procedure between base station and a user equipment (UE)

FIG. 6 is a message flow diagram 600 of a connection procedure between base station 105-*b* and a UE 115-*b*. A broadcast managing (BM) device 205-*d* may facilitate at least a portion of communications between the base station 105-*b* and the UE 115-*b*. The broadcast managing device 205-*b* may be connected to, and part of the UE 115-*b*. The broadcast managing device 205-*d* may be one example of the broadcast managing device 205 depicted in FIGS. 2, 3, 4, and/or 5. The base station 105-*b* may be an example of the base station 105 illustrated in FIGS. 1 and/or 2. The UE 115-*b* may be an example of the UE 115 described in FIGS. 1 and/or 2.

In one example, a request to join a multicast (MC) session 605 may originate from the UE 115-*b*. The broadcast managing device 205-*d* may handle radio access network (RAN) procedures including the broadcast of system information necessary on behalf of the UE 115-*b* to enable the UE 115-*b* to communicate with the base station 105-*b*. In response to the transmission of the request to join the multicast session 605, the broadcast managing device 205-*d* may identify an association between a multicast IP address identifying the multicast session and a broadcast technology based identifier 610. Upon identifying the association between the multicast IP address and the broadcast technology based identifier 610, the broadcast managing device 205-*d* may receive control information from the base station 105-*b* according to the identified broadcast technology. The broadcast managing device 205-*d* may determine that the control information is associated with the desired multicast data stream for the multicast session. The broadcast managing device 205-*d* may receive 615 a multicast stream of data corresponding to the identified control information. The multicast stream of data may be associated with the requested multicast session. The broadcast managing device 205-*d* may then transmit 620 the multicast stream of data to the UE 115-*b*.

Figure 7:
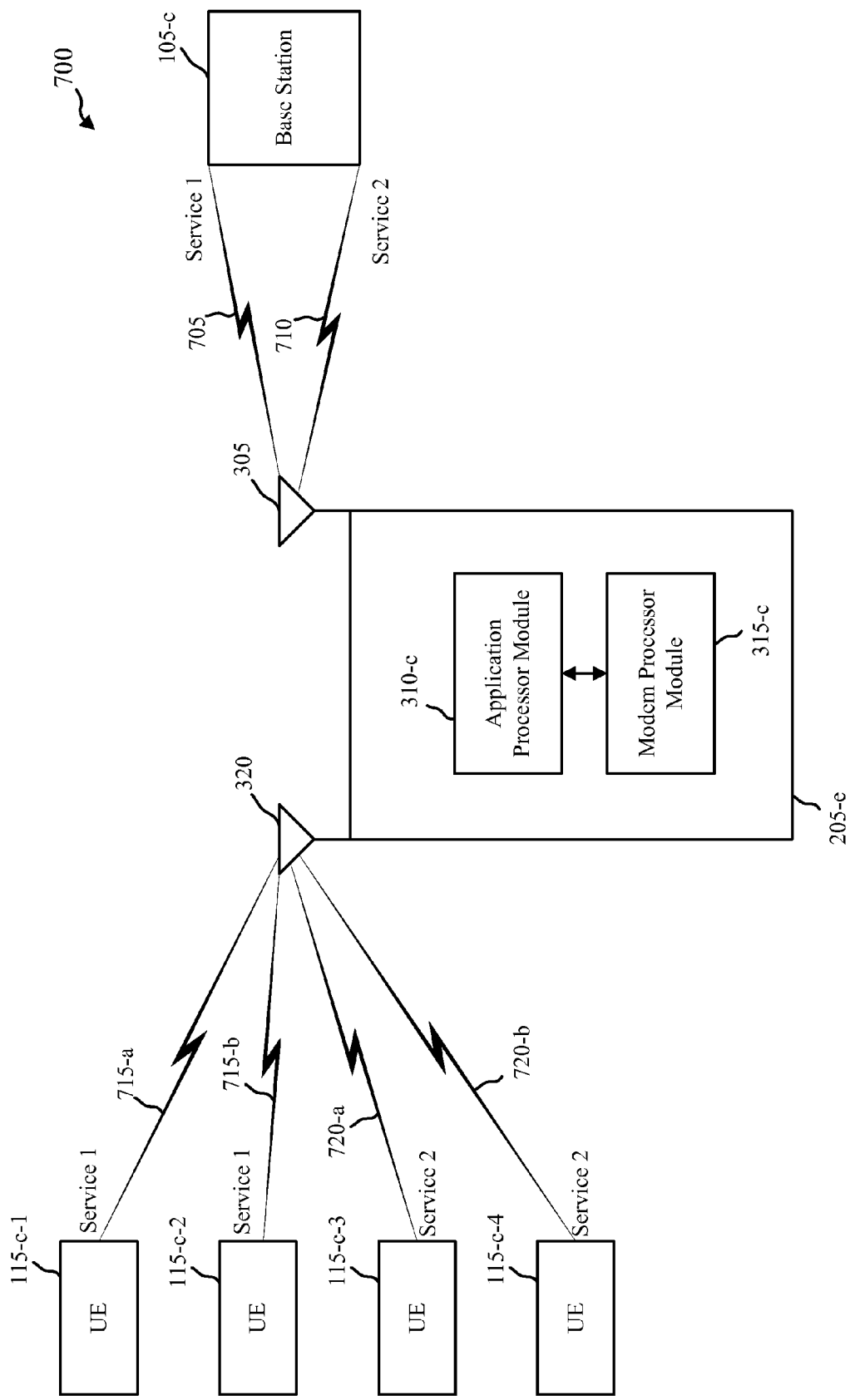
FIG. 7 is a block diagram of a communication system including base station and various UEs.

FIG. 7 is a block diagram 700 of a communication system including a base station 105-*c*, a broadcast managing device 205-*e*, and a plurality of UEs 115. In one example, the base station 105-*c* may broadcast a number of services (i.e., multicast sessions, subscription channels, etc.). For example, the base station 105-*c* may broadcast service 1 705 and service 2 710. The broadcast managing device 205-*e* may include an application processor module 310-*c* and a modem processor module 315-*c*. The base station 105-*c* and various UEs, 115-*c*-1 to 115-*c*-4 may be examples of the base station 105 and UE 115 depicted in FIGS. 1, 2, and/or 6. The broadcast managing device 205-*e* may be an example of the broadcast managing device 205 described in FIGS. 2, 3, 4, 5, and/or 6.

In some embodiments, some of the multiple UEs 115 may request to join the same multicast session, while other UEs may request to join different multicast sessions. For example, a first UE 115-*c*-1 and a second UE 115-*c*-2 may desire to join a multicast session indicated as service 1. The broadcast managing device 205-*c* may receive requests from the UEs 115-*c*-1 and 115-*c*-2 to join the first multicast session. The session may be identified by a first multicast IP address. Additionally, broadcast managing device 205-*c* may receive requests from UEs 115-*c*-3 and 115-*c*-4 to join a second multicast session that is identified by a second multicast IP address. The second multicast IP address may be different from the first multicast IP address. The application processor module 310-*c* may identify an association between the first and second multicast IP addresses and a broadcast technology based identifier. The application processor module 310-*c* may receive an out-of-band signaling that includes an identification of the control information associated with the data streams for the first and second multicast sessions. The application processor 310-*c* may transfer the broadcast technology based identifier to the modem processor module 315-*c*. The modem processor module 315-*c* may use the broadcast technology based identifier and the received control information to identify first control information received from the base station 105-*c* for service 1 according to the identified broadcast technology. The modem processor module 315-*c* may use the broadcast technology based identifier and control information to identify second control information received from the base station 105-*c* for service 2 according to the identified broadcast technology. Thus, the modem processor module 315-*c* may associate the first control information with service 1 705, and the second control information with service 2 710. In some embodiments, service 1 705 may include a first TMGI, and service 2 710 may include a second TMGI.

The broadcast managing device 205-*e* may receive service 1 705 (e.g., a first multicast stream of data) from base station 105-*c*. As previously described, service 1 705 may be associated with the first control information. The device 205-*c* may also receive service 2 710 (e.g., a second multicast stream of data) from the base station 105-*c*. Service 2 710 may be associated with the second control information. The broadcast managing device 205-*e* may replicate service 1 705 into replicated service 1 715-*a*, 715-*b*. The device 205-*e* may also replicate service 2 710 into replicated service 2 720-*a*, 720-*b*. Replicated service 1 715-*a*, 715-*b* may be transmitted to the first and second UEs 115-*c*-1 and 115-*c*-2. Similarly, replicated service 2 720-*a*, 720-*b* may be transmitted to the third and fourth UEs 115-*c*-3 and 115-*c*-4.

Figure 8:
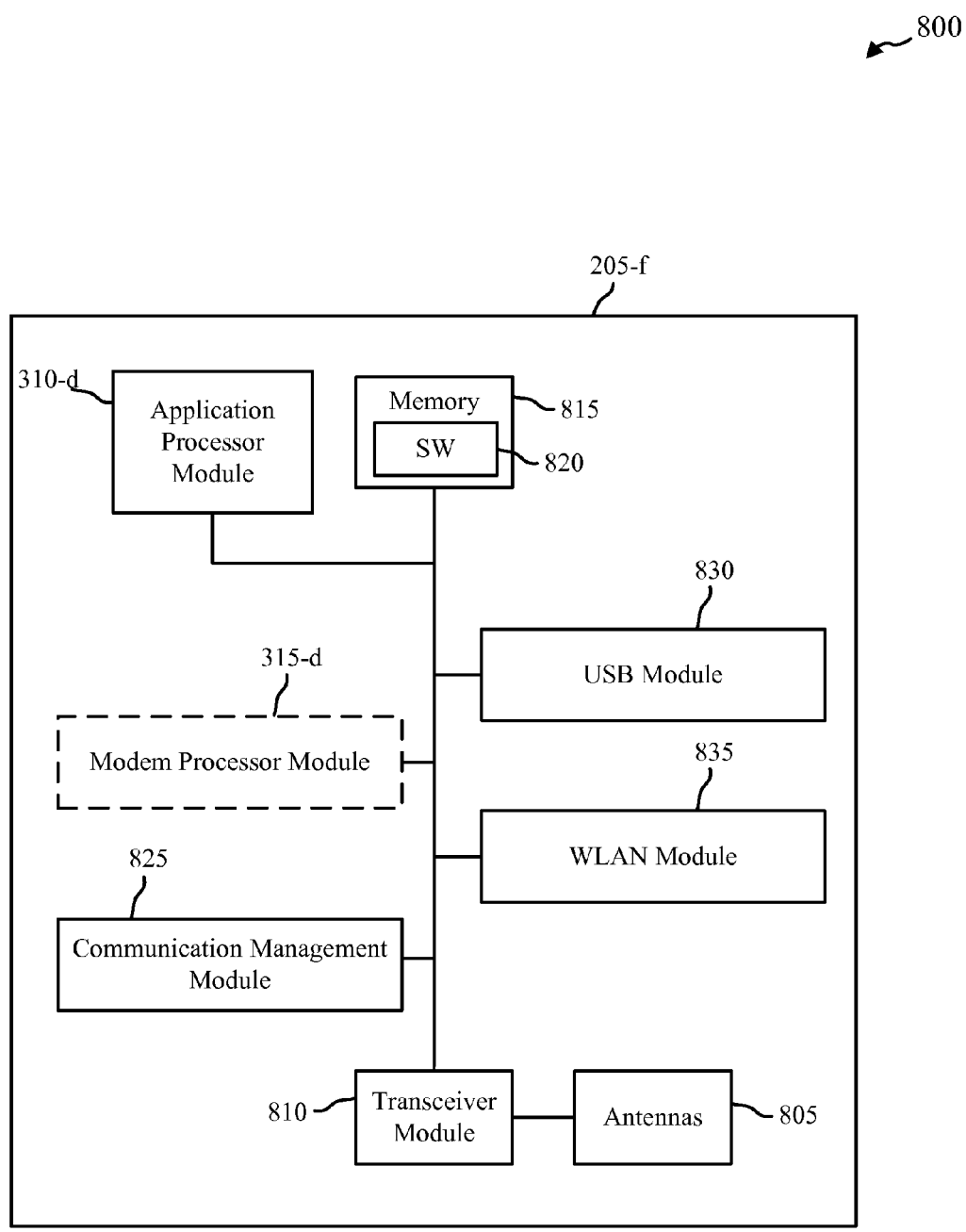
FIG. 8 is a block diagram of a communications system that may be configured for mapping technology identifiers in accordance with various embodiments.

FIG. 8 is a block diagram 800 of a broadcast managing device 205-*f* that may be configured for managing broadcasted multicast sessions in accordance with various embodiments. The broadcast managing device 205-*f* may be a data router (WLAN router), a data card, etc. The broadcast managing device 205-*f* may have an internal power supply (not shown), such as a small battery, to facilitate mobile operation. In some embodiments, the broadcast managing device 205-*f* may be an example of the device 205 of FIGS. 2, 3, 4, 5, 6, and/or 7.

The broadcast managing device 205-*f* may include antennas 805, a transceiver module 810, memory 815, an application processor module 310-*d*, and a modem processor module 315-*d*. Each of the components of the processor modules 310-*d* and 315-*d* to implement the present systems and methods may not be repeated here for the sake of brevity. Each component may be in communication, directly or indirectly, with each other (e.g., via one or more buses). The transceiver module 810 is configured to communicate bi-directionally, via the antennas 805 and/or one or more wired or wireless links, with one or more networks, as described above. The transceiver module 810 may include a modem (such as the modem processor module 315-*d*) configured to modulate the packets and provide the modulated packets to the antennas 805 for transmission, and to demodulate packets received from the antennas 805. While the broadcast managing device 205-*f* may include a single antenna, the broadcast managing device 205-*f* may include multiple antennas 805 for multiple links.

The memory 815 may include random access memory (RAM) and read-only memory (ROM). The memory 815 may store computer-readable, computer-executable software code 820 containing instructions that are configured to, when executed, cause the processor modules 310-*d* and 315-*d* to perform various functions. Alternatively, the software code 820 may not be directly executable by the processor modules 310-*d* and 315-*d*, but be configured to cause the computer (e.g., when compiled and executed) to perform functions described herein.

The processor modules 310-*d* and 315-*d* may include intelligent hardware devices, e.g., a central processing unit (CPU) such as those made by Intel® Corporation or AMD®, a microcontroller, an application-specific integrated circuit (ASIC), etc. According to the architecture of FIG. 8, the broadcast managing device 205-*f* may further include a communications management module 825. The communications management module 825 may manage communications with other mobile devices (e.g., UEs 115, base stations 105, etc.). By way of example, the communications management module 825 may be a component of the broadcast managing device 205-f in communication with some or all of the other components of the broadcast managing device 205-*f* via a bus. Alternatively, functionality of the communications management module 825 may be implemented as a component of the transceiver module 810, as a computer program product, and/or as one or more controller elements of the processor modules 310-*d* and 315-*d*.

In some embodiments, the broadcast managing device 205-*f* may optionally include a USB module 830. The USB module 830 may enable the broadcast managing device 205-*f* to communicate with a device 115 via a USB cable or via a wireless USB connection. In some configurations, the broadcast managing device 205-*f* may optionally include a WLAN module 835. The WLAN module 835 may enable the broadcast managing device 205-*f* to communicate with a device 115 via a wireless connection (e.g., 802.11). The USB module 830 and WLAN module 835 may be used to broadcast multicast streams of data to a UE 115 that have been received from a base station 105 implementing a particular broadcast technology.

Figure 9:
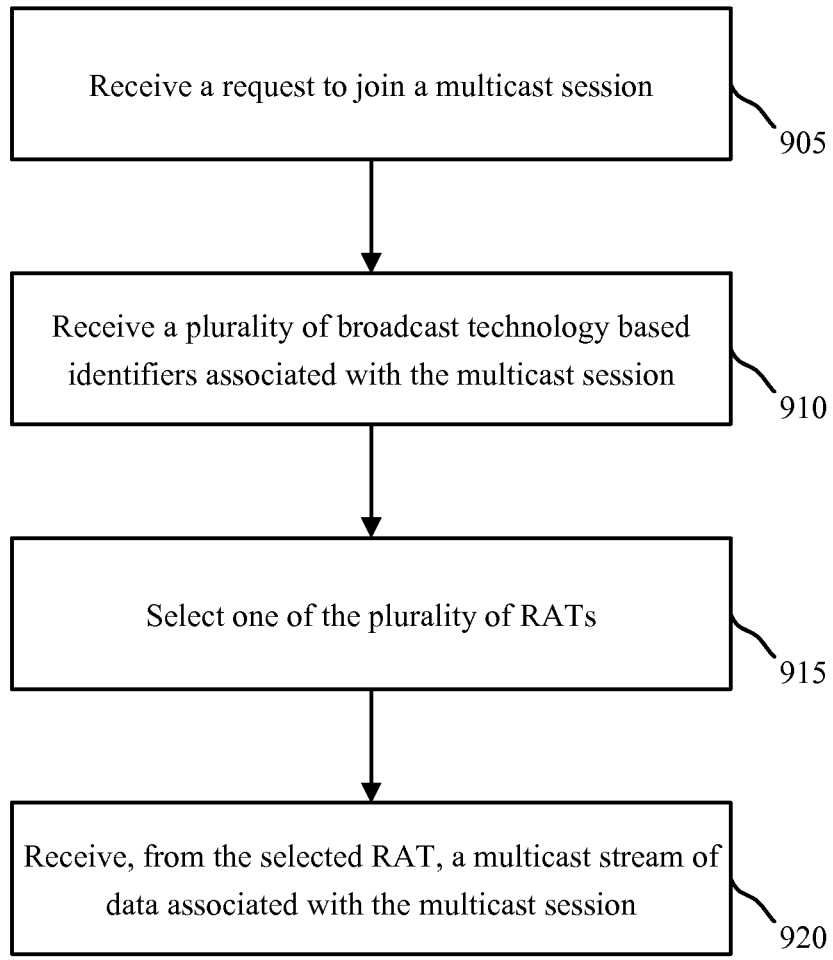
FIG. 9 is a flowchart of a method for mapping technology identifiers in accordance with various embodiments.

FIG. 9 is a flowchart of a method 900 for managing broadcasts of multicast data streams in accordance with various embodiments. For clarity, the method 900 is described below with reference to the broadcast managing device 205 of FIGS. 2, 3, 4, 5, 6, 7, and/or 8. In one implementation, the application and modem processor modules 310 and 315 of FIGS. 3, 4, 5, 7, and/or 8 may execute one or more sets of instructions to perform the functions described below.

At block 905, a request to join a multicast session may be received. At block 910, a plurality of broadcast technology based identifiers associated with the multicast session may be received. Each broadcast technology based identifier may identify one of a plurality of radio access technologies (RATs) broadcasting the multicast session. At block 915, one of the plurality of RATs may be selected. At block 920, a multicast stream of data associated with the multicast session may be received from the selected RAT.

The method 900 may provide for joining a multicast session identified by a multicast IP address by mapping a multicast IP address identifier to a technology-specific identifier. It should be noted that the method 900 is just one implementation and that the operations of the method 900 may be rearranged or otherwise modified such that other implementations are possible.

Figure 10:
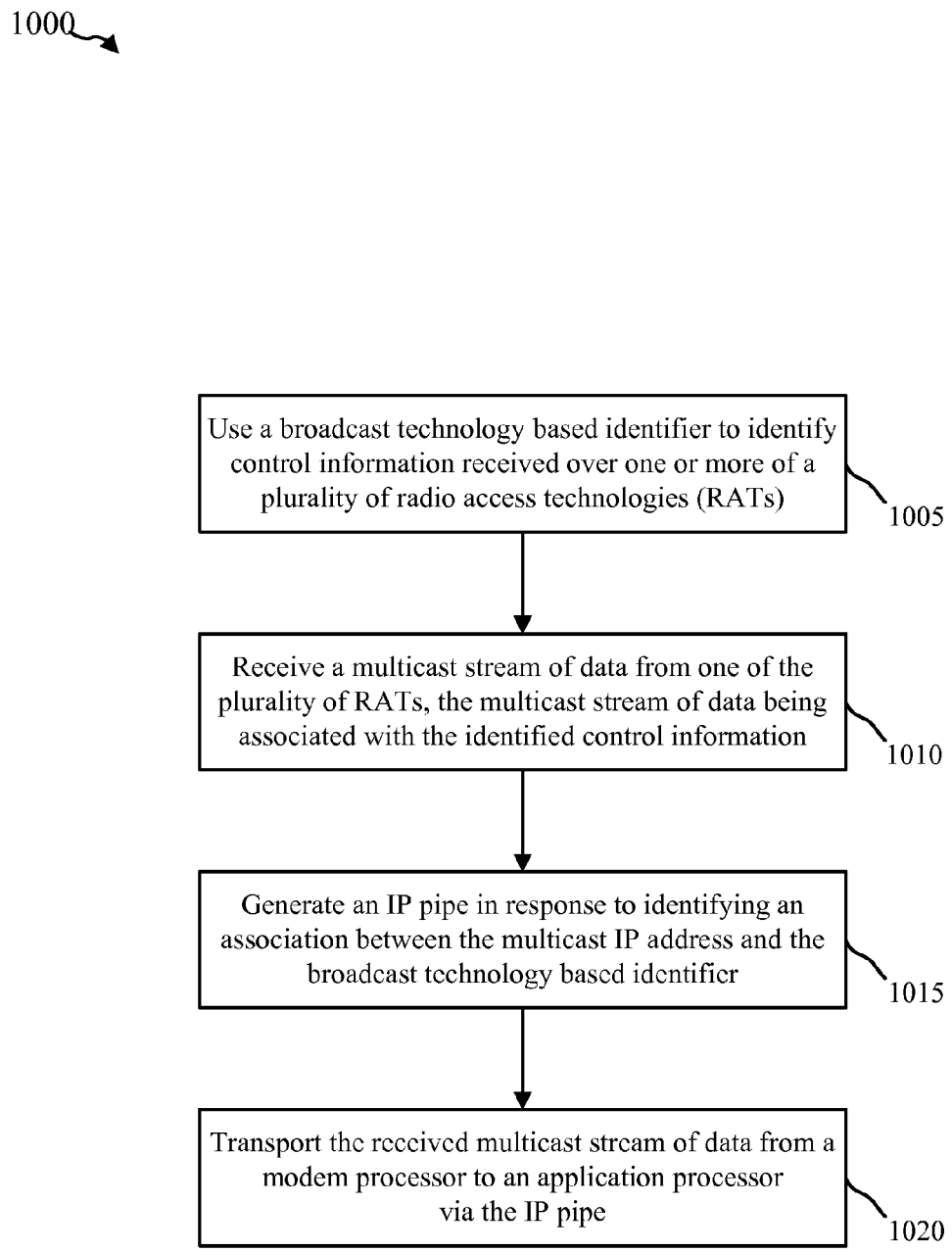
FIG. 10 is a flowchart of a method for transporting a multicast stream of data.

FIG. 10 is a flowchart of a method 1000 for transporting a multicast stream of data. For clarity, the method 1000 is described below with reference to the broadcast managing device 205 of FIGS. 2, 3, 4, 5, 6, 7, and/or 8. In one implementation, the application and modem processor modules 310 and 315 of FIGS. 3, 4, 5, 7, and/or 8 may execute one or more sets of instructions to perform the functions described below.

At block 1005, a broadcast technology based identifier may be used to identify control information received over one or more of a plurality of RATs. At block 1010, a multicast stream of data may be received from one of the plurality of RATs. The multicast stream of data may be associated with the identified control information. At block 1015, an IP pipe may be generated in response to identifying an association between the multicast IP address and the broadcast technology based identifier. At block 1020, the received multicast stream of data may be transported from a modem processor to an application processor via the IP pipe.

Therefore, upon mapping the multicast IP address identifier to the technology-specific identifier, the method 1000 may provide for transporting the multicast stream of data to the application processor module that received a request to join the associated multicast session. It should be noted that the method 1000 is just one implementation and that the operations of the method 1000 may be rearranged or otherwise modified such that other implementations are possible.

Figure 11:
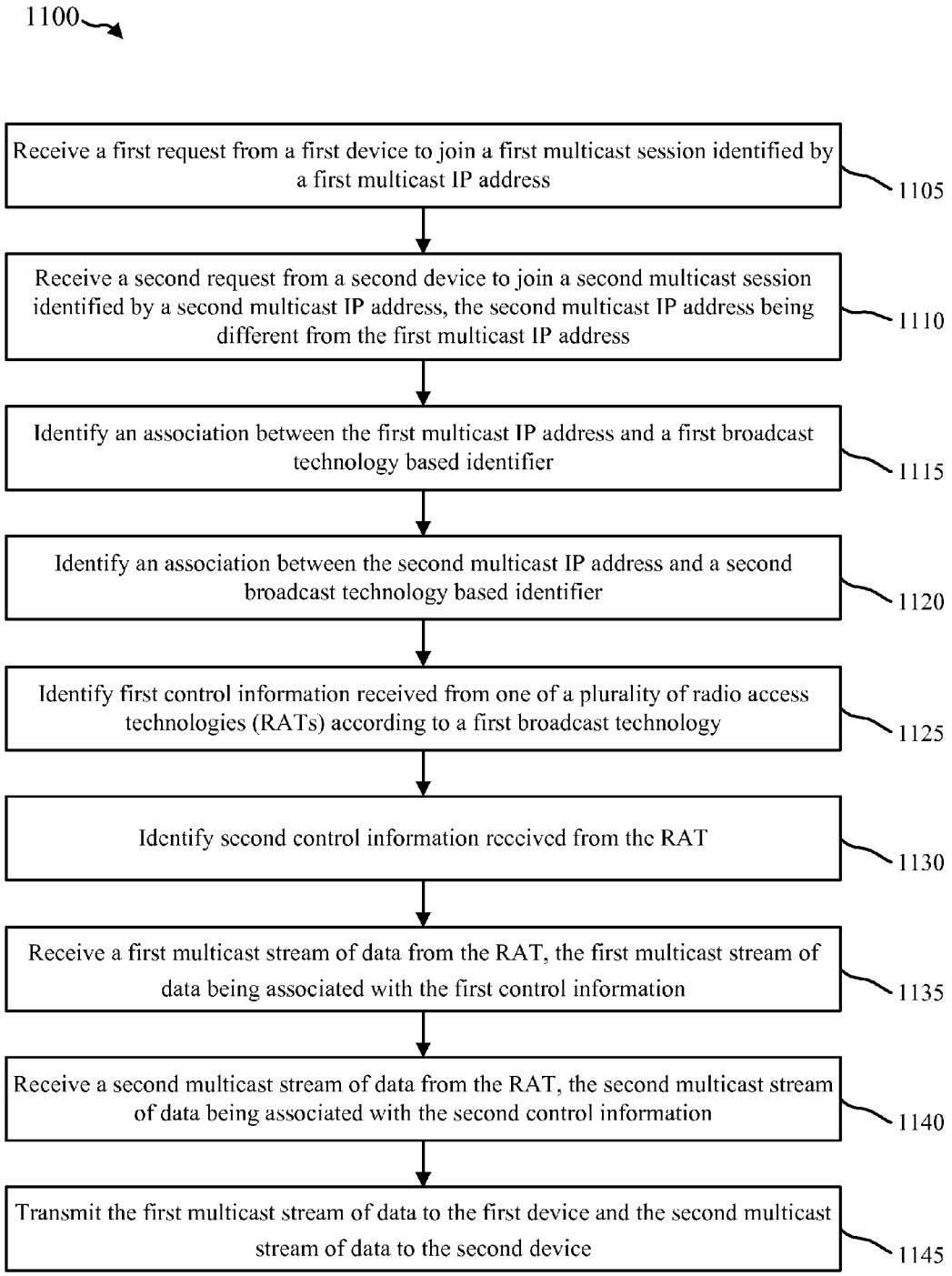
FIG. 11 is a flowchart of a method for transporting multiple multicast streams of data in accordance with the present systems and methods.

FIG. 11 is a flowchart of a method for transporting multiple multicast streams of data. For clarity, the method 1100 is described below with reference to the broadcast managing device 205 of FIGS. 2, 3, 4, 5, 6, 7, and/or 8. In one implementation, the application and modem processor modules 310 and 315 of FIGS. 3, 4, 5, 7, and/or 8 may execute one or more sets of instructions to perform the functions described below.

At block 1105, a first request may be received from a first device to join a first multicast session identified by a first multicast IP address. At block 1110, a second request may be received from a second device to join a second multicast session identified by a second multicast IP address. In some configurations, the second multicast IP address may be different from the first multicast IP address. Alternatively, the IP addresses may be the same address.

At block 1115, an association between the first multicast IP address and a first broadcast technology based identifier may be identified. At block 1120, an association between the second multicast IP address and a second broadcast technology based identifier may be identified. The broadcast technology based identifiers may be transported to a modem processor. At block 1125, first control information received from one of a plurality of RATs according to the identified broadcast technology may be identified. At block 1130, second control information received from the RAT according to the identified broadcast technology may be identified. In some configurations, the broadcast technology based identifier may be used to broadcasts from an eMBMS RAT. In some embodiments, the control information may include a temporary mobile group identity (TMGI).

At block 1135, a first multicast stream of data may be received from the RAT. The first multicast stream of data may be associated with the first control information. At block 1140, a second multicast stream of data may be received from the RAT. In one embodiment, the second multicast stream of data may be associated with the second control information. At block 1145, the first multicast stream of data may be transmitted to the first device and the second multicast stream of data may be transmitted to the second device.

Therefore, multiple multicast IP addresses that each address a particular multicast session may be identified as associated with a broadcast technology identifier. The identifier may be used to identify a particular broadcast technology being used to broadcast a multicast data stream for each multicast session. The various data streams may be transmitted to the devices requesting to join the corresponding multicast sessions. In some embodiments, the multicast stream of data associated with the multicast session may be received via a Long Term Evolution (LTE) femto cell or a home eNode B (HeNB). In one example, at least a portion of the multicast stream of data associated with the multicast session may be received using an unlicensed frequency spectrum. In some cases, an unlicensed band may be used as a supplemental downlink (SDL) in association with a primary cell operating on a carrier in a licensed band. In some cases, an unlicensed band may be used in a shared-use configuration with a 802.11 wireless network. It should be noted that the method 1100 is just one implementation and that the operations of the method 1100 may be rearranged or otherwise modified such that other implementations are possible.

Figure 12:
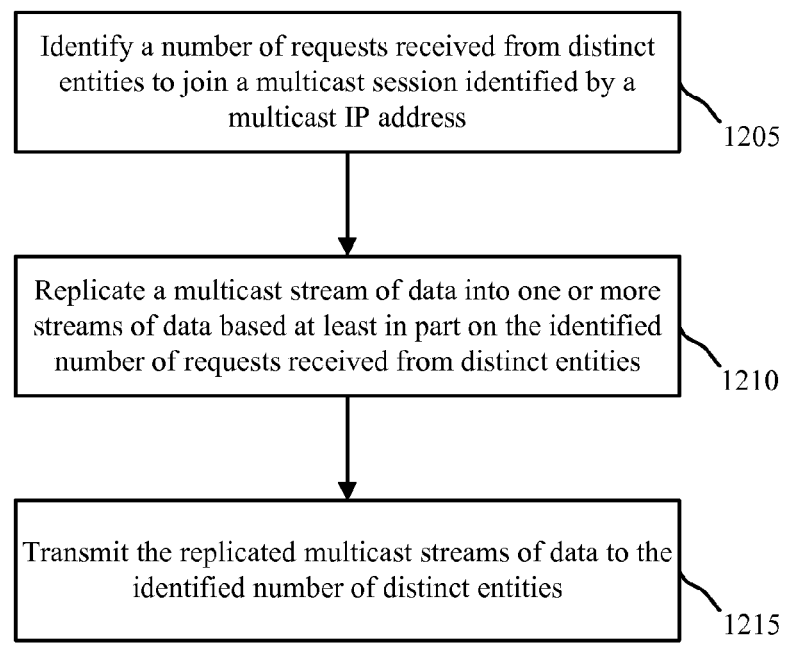
FIG. 12 is a flowchart of a method for broadcasting replicated multicast streams of data in accordance with various embodiments.

FIG. 12 is a flowchart of a method for transporting replicated multicast streams of data. For clarity, the method 1200 is described below with reference to the broadcast managing device 205 of FIGS. 2, 3, 4, 5, 6, 7, and/or 8. In one implementation, the application and modem processor modules 310 and 315 of FIGS. 3, 4, 5, 7, and/or 8 may execute one or more sets of instructions to perform the functions described below.

At block 1205, a number of requests to join a multicast session may be received from a number of distinct entities. The multicast session may be identified by a multicast IP address. In some embodiments, the distinct entities may request to join the same multicast session. At block 1210, the multicast stream of data for the multicast session may be replicated into one or more streams of data based at least in part on the identified number of requests received from distinct entities. At block 1215, the replicated multicast streams of data may be transmitted to the identified number of distinct entities.

Therefore, the method 1200 may provide for transporting replicated multicast streams of data to multiple distinct devices that have requested to join the same multicast session. It should be noted that the method 1200 is just one implementation and that the operations of the method 1200 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein, but is to be accorded the widest scope consistent with the principles and novel features disclosed herein.

What is claimed is:

1. A method for managing broadcasts of data in wireless communications, comprising:
   receiving, by an application processor of a broadcast managing device from a modem processor of the broadcast managing device, a list of broadcast technology based identifiers, each broadcast technology based identifier identifying a particular radio access technology (RAT) currently broadcasting to the modem processor;
   receiving, by the application processor from a user equipment (UE), a request to join the UE to a multicast session;
   identifying, by the application processor, a multicast Internet Protocol (IP) address in the request, the multicast session being identified by the multicast IP address;
   receiving, by the application processor, out-of-band signaling that identifies first control information for an identified RAT;
   transferring, by the application processor to the modem processor, the first control information for the identified RAT;
   analyzing, by the modem processor, the first control information;
   identifying, by the modem processor, second control information broadcasted from the identified RAT based at least in part on the analysis of the first control information;
   selecting, by the modem processor, the identified RAT based at least in part on the second control information;
   receiving, by the modem processor from the selected RAT, a multicast stream of data associated with the multicast session;
   generating, by the modem processor, an IP pipe between the modem processor and the application processor based at least in part on the broadcast technology based identifier identifying the selected RAT; and
   transporting, by the modem processor, the received multicast stream of data from the modem processor to the application processor via the IP pipe.

2. The method of claim 1, further comprising:
   replicating the multicast stream of data into one or more streams of data based at least in part on the identified number of requests received from distinct entities; and
   transmitting the replicated multicast streams of data to an identified number of distinct entities.

3. The method of claim 1, wherein receiving the request comprises:
   receiving a first request from a first device to join a first multicast session identified by a first multicast IP address; and
   receiving a second request from a second device to join a second multicast session identified by a second multicast IP address, the second multicast IP address being different from the first multicast IP address.

4. The method of claim 3, further comprising:
   determining a first broadcast technology based identifier based at least in part on the first multicast IP address; and
   determining a second broadcast technology based identifier based at least in part on the second multicast IP address.

5. The method of claim 4, further comprising:
   using the first broadcast technology based identifier to select a first radio access technology (RAT), the first RAT implementing a first broadcast technology identified by the first broadcast technology based identifier; and
   using the second broadcast technology based identifier to select a second RAT, the second RAT implementing a second broadcast technology identified by the second broadcast technology based identifier.

6. The method of claim 5, further comprising:
   receiving a first multicast stream of data from the first RAT, the first multicast stream of data being associated with first control information; and receiving a second multicast stream of data from the second RAT, the second multicast stream of data being associated with second control information.

7. The method of claim 6, further comprising:
transmitting the first multicast stream of data to the first device; and
transmitting the second multicast stream of data to the second device.

8. The method of claim 1, further comprising:
transferring the broadcast technology based identifier to a modem processor, the broadcast technology based identifier identifying the selected RAT; and
transferring, to the modem processor, control information used by the selected RAT.

9. The method of claim 1, wherein the broadcast technology based identifier is used to identify an enhanced Multimedia Broadcast Multicast Service (eMBMS) RAT.

10. The method of claim 9, wherein the eMBMS RAT transmits control information comprising a Temporary Mobile Group Identity (TMGI).

11. The method of claim 1, wherein the multicast stream of data associated with the multicast session is received via a Long Term Evolution (LTE) femto cell.

12. The method of claim 1, wherein at least a portion of the multicast stream of data associated with the multicast session is received using an unlicensed frequency spectrum.

13. A device configured to manage broadcasts of data in wireless communications, comprising:
a modem processor;
an application processor;
a memory in electronic communication with at least one of the processors; and
instructions stored in the memory, the instructions being executable by at least one of the processors to:
receive a list of broadcast technology based identifiers, each broadcast technology based identifier identifying a particular radio access technology (RAT) currently broadcasting to the modem processor;
receive a request from a user equipment (UE) to join the UE to a multicast session;
identify, by the application processor, a multicast Internet Protocol (IP) address in the request, the multicast session being identified by the multicast IP address;
receive, by the application processor, out-of-band signaling that identifies first control information for an identified RAT;
transferr, by the application processor to the modem processor, the first control information for the identified RAT;
analyze, by the modem processor, the first control information;
identify, by the modem processor, second control information broadcasted from the identified RAT based at least in part on the analysis of the first control information;
select, by the modem processor, the identified RAT based at least in part on the second control information;
receive, from the selected RAT, a multicast stream of data associated with the multicast session;
generate an IP pipe between the modem processor and the application processor based at least in part on the broadcast technology based identifier identifying the selected RAT; and
transport the received multicast stream of data from the modem processor to the application processor via the IP pipe.

14. The device of claim 13, wherein the instructions are executable by at least one of the processors to:
identify control information associated with the multicast session, the control information being received the RAT.

15. The device of claim 13, wherein the instructions are executable by at least one of the processors to:
replicate the multicast stream of data into one or more streams of data based at least in part on the identified number of requests received from distinct entities; and
transmit the replicated multicast streams of data to an identified number of distinct entities.

16. The device of claim 13, wherein the instructions are executable by at least one of the processors to:
receive a first request from a first device to join a first multicast session identified by a first multicast IP address; and
receive a second request from a second device to join a second multicast session identified by a second multicast IP address, the second multicast IP address being different from the first multicast IP address.

17. The device of claim 16, wherein the instructions are executable by at least one of the processors to:
determine a first broadcast technology based identifier based at least in part on the first multicast IP address; and
determine a second broadcast technology based identifier based at least in part on the second multicast IP address.

18. The device of claim 17, wherein the instructions are executable by at least one of the processors to:
use the first broadcast technology based identifier to select a first radio access technology (RAT), the first RAT implementing a first broadcast technology identified by the first broadcast technology based identifier; and
use the second broadcast technology based identifier to select a second RAT, the second RAT implementing a second broadcast technology identified by the second broadcast technology based identifier.

19. The device of claim 18, wherein the instructions are executable by at least one of the processors to:
receive a first multicast stream of data from the first RAT, the first multicast stream of data being associated with first control information;
receive a second multicast stream of data from the second RAT, the second multicast stream of data being associated with second control information;
transmit the first multicast stream of data to the first device; and
transmit the second multicast stream of data to the second device.

20. An apparatus to manage broadcasts of data in wireless communications, comprising:
means for receiving a list of broadcast technology based identifiers, each broadcast technology based identifier identifying a particular radio access technology (RAT) currently broadcasting to a modem processor;
means for receiving a request from a user equipment (UE) to join the UE to a multicast session, the apparatus comprising an application processor and the modem processor;
means for identifying, by the application processor, a multicast Internet Protocol (IP) address in the request, the multicast session being identified by the multicast IP address;
means for receiving out-of-band signaling that identifies first control information for an identified RAT;

means for transferring to the modem processor the first control information for the identified RAT;
means for analyzing the first control information;
means for identifying second control information broadcasted from the identified RAT based at least in part on the analysis of the first control information;
means for selecting the identified RAT based at least in part on the second control information;
means for receiving, from the selected RAT, a multicast stream of data associated with the multicast session;
means for generating an IP pipe between the modem processor and the application processor based at least in part on the broadcast technology based identifier identifying the selected RAT; and
means for transporting the received multicast stream of data from the modem processor to the application processor via the IP pipe.

21. The apparatus of claim 20, further comprising:
means for replicating the multicast stream of data into one or more streams of data based at least in part on the identified number of requests received from distinct entities; and
means for transmitting the replicated multicast streams of data to an identified number of distinct entities.

22. A non-transitory computer-readable medium storing instructions executable by at least one of an application processor and a modem processor to:
receive a list of broadcast technology based identifiers, each broadcast technology based identifier identifying a particular radio access technology (RAT) currently broadcasting to the modem processor;
receive a request from a user equipment (UE) to join the UE to a multicast session;
identify, by the application processor, a multicast Internet Protocol (IP) address in the request, the multicast session being identified by the multicast IP address;
receive, by the application processor, out-of-band signaling that identifies first control information for an identified RAT;
transferr, by the application processor to the modem processor, the first control information for the identified RAT;
analyze, by the modem processor, the first control information;
identify, by the modem processor, second control information broadcasted from the identified RAT based at least in part on the analysis of the first control information;
select, by the modem processor, the identified RAT based at least in part on the second control information;
receive, from the selected RAT, a multicast stream of data associated with the multicast session;
generate an IP pipe between the modem processor and the application processor based at least in part on the broadcast technology based identifier identifying the selected RAT; and
transport the received multicast stream of data from the modem processor to the application processor via the IP pipe.

* * * * *